No. 726,961. PATENTED MAY 5, 1903.
P. MEDART.
BELT PULLEY.
APPLICATION FILED NOV. 22, 1902.
NO MODEL.
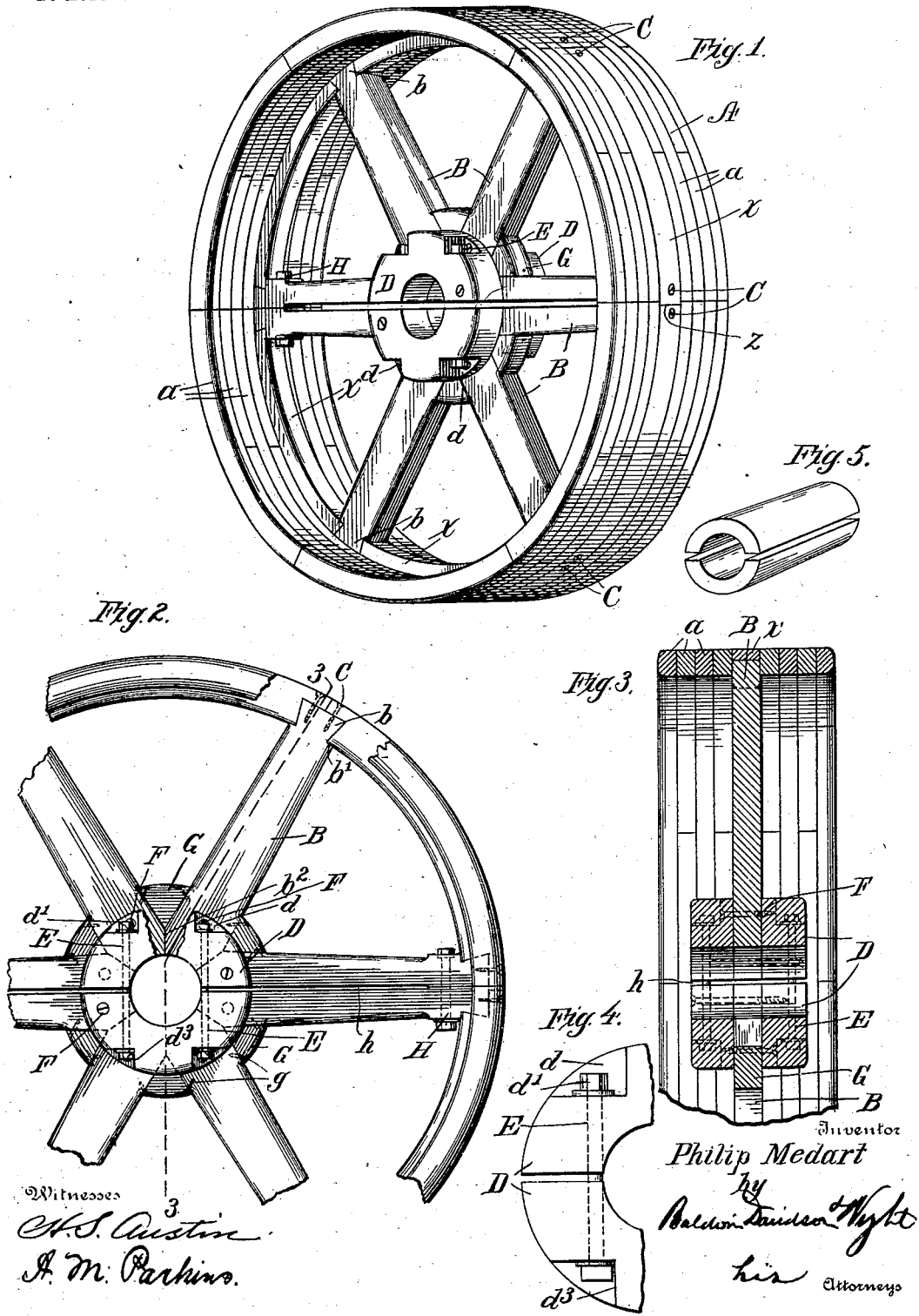
Inventor
Philip Medart
by
Baldwin Davidson Wight
his Attorneys
Witnesses No. 726,961. Patented May 5, 1903.

UNITED STATES PATENT OFFICE.

PHILIP MEDART, OF ST. LOUIS, MISSOURI.

BELT-PULLEY.

SPECIFICATION forming part of Letters Patent No. 726,961, dated May 5, 1903.

Application filed November 22, 1902. Serial No. 132,474. (No model.)

*To all whom it may concern:*

Be it known that I, PHILIP MEDART, a citizen of the United States, residing at St. Louis, in the State of Missouri, have invented certain new and useful Improvements in Belt-Pulleys, of which the following is a specification.

My invention relates particularly to pulleys of the class that are divided in such manner as to be readily applied to and taken from line-shafting laterally without moving the shaft and without disturbing other pulleys or fixtures connected with the shaft. Such pulleys have been made entirely of metal, solely of wood, or partly of metal and partly of other material, such as wood. Some of my improvements may be embodied in any of these different classes of pulleys; but I have embodied all of them in a pulley made entirely of wood with the parts held together by glue or cement and metallic securing devices.

One object of my invention is to provide a pulley which while strong and durable may be composed of parts that can be easily made on a large scale by machinery and can be easily assembled and secured together. Many pulleys heretofore constructed while strong and durable have been found not to be practicable, because of the expense of manufacture, many of the parts being necessarily formed by hand or by complicated machinery requiring much skill in its operation. I have sought to obviate these objections by so constructing a pulley of this class that the different parts may be made by simple machinery, turning them out rapidly and uniformly, so that the parts may be quickly assembled with absolute accuracy.

Another object of my invention is to so construct a pulley of this class that while the component parts may be expeditiously made by machinery they shall when assembled be thoroughly braced and tied together, while distortion of the parts by shrinkage or other causes is so reduced as to render the pulley sufficiently rigid for all practical purposes and capable of remaining in service for a comparatively long time.

The rim of the pulley in which I have preferred to embody all my improvements so far as they are contained in this patent is concerned is made up of a series of wooden rings placed side by side and secured together, each ring being composed of a plurality of segments, which break joints with the segments in adjacent rings in the usual way. The middle ring of the rim is made deeper than the others, and the spokes or arms of the pulley are formed with dovetailed tenons on their outer ends, which engage corresponding mortises in the middle ring, screws passing radially inward through the rim into the tenons being used for greater security. The spokes are of approximately the same thickness as the middle ring of the rim, and their inner ends are beveled in such manner as to fit closely together around the bore or shaft-opening. A separately-formed wedge-shaped brace is interposed between each two adjacent spokes in the angle formed at their inner ends, and a hub made in sections is attached to the spokes on opposite sides of their inner ends. The pulley is divided into two equal parts by being split through two of the spokes and through diametrically opposite portions of the rim. Bolts on the hub arranged at right angles to the bore are employed for clamping the pulley on the shaft.

In the accompanying drawings, Figure 1 is a perspective view of a split wood pulley embodying my present improvements. Fig. 2 shows an elevation of a portion of this pulley, some of the parts being broken away for the purpose of better illustrating other parts. Fig. 3 shows a section on the line 3 3 of Fig. 2. Fig. 4 is a detail view, on an enlarged scale, of a portion of the hub. Fig. 5 is a perspective view of a bushing which may be used.

The rim A is shown as being composed of a series of rings $a$, arranged side by side to form a rim of sufficient width and thickness. Each ring is shown as being composed of a plurality of segments breaking joints in the usual way. The middle ring $x$ is somewhat deeper than the others in order to permit mortises of sufficient size for the spoke-tenons to be formed without extending to the outer surface of the rim or approximating this outer surface so closely as to unduly weaken the rim at the ends of the spokes. These mortises are formed to receive dovetailed tenons $b$ on the ends of the spokes B, which latter are preferably of the same width as the middle ring $x$, and the tenons snugly fit and fill the mortises, the rings on opposite sides of the middle ring being arranged to lie close against said middle ring and against the opposite sides of the tenons.

In constructing the rim and in securing the spokes thereto the tenons are first slid laterally into place in the mortises of the middle ring, and then the segments of the other rings are applied and secured by glue and nails in the usual way. It will be observed that the rim rests on shoulders $b'$ at the inner ends of the tenons, as well as on the outer ends thereof, so that inward radial pressure is taken not only by the outer ends of the tenons, but also by said shoulders. Each spoke is secured to the ring $x$ by means of screws C, which are passed radially inward from the outside of the ring into the tenons. Preferably the joints of the segments composing the ring are made at the ends of the spokes, and the ends of the segments which overlap the ends of the spokes are attached thereto by the screws C. This joint is found to be most secure and to effectually resist any tendency of the parts to separate by centrifugal force or other causes. The inner portions of the spokes are brought together around the bore or shaft-opening and are closely fitted by being beveled at $b^2$ on lines radial to the axis of the pulley. They are curved at their extreme inner ends to form a continuous circular opening for the shaft or bushing.

The hub D, which may be made of hard wood, is formed in four similar parts, each semicircular or semi-annular in general outline. Each part is formed with a flat inner side adapted to lie close against the inner portions of the spokes, and each hub-section is bored transversely to receive a clamping-bolt E, being recessed at $d$ to accommodate the head or nut of the clamping-bolt. The two hub-sections on each side of the pulley are connected by two bolts E, which are arranged parallel with each other on opposite sides of the bore in lines at right angles to the axis thereof. The recesses $d$ in each hub-section while of the same general form are slightly different. One of them—for instance, that shown at the upper left-hand side in Fig. 2—is made of sufficient size to accommodate the nut $d'$ and to permit it to be easily turned. The recess $d$ on the hub-section immediately below the recess above mentioned is adapted to accommodate the head of the bolt, and the wall $d^3$ of this recess is made to lie close to the bolt-head in such manner as to prevent the bolt from turning when the nut is being adjusted. This recess $d$ is shown as having two vertical walls. Either one or both of them may be made to lie close to the bolt-head, for the purpose specified. In Fig. 4 I have shown this construction on an enlarged scale. Each recess is open on three sides, so that the bolts may be conveniently inserted or withdrawn and the nuts may be easily reached by suitable tools for adjusting them.

The two hub-sections on the opposite sides of the spokes and on the same side of the bore are connected to each other and to the spokes by screws F. These screws preferably pass alternately in opposite directions through the hub-sections and spokes. In Fig. 2 the head of one of the screws is shown in the recess $d$ at the upper left-hand corner of the hub. A screw may be similarly passed from the recess $d$ at the upper right-hand corner of the hub through the parts, or the screw may be inserted in an opposite direction and not pass into the recess. The alternate arrangement of the screws is shown in Fig. 3 in dotted lines.

In Fig. 2 the clamping-bolts are shown as being passed through the hub-sections in opposite directions, so that on each side of the pulley the head of one bolt is below the axis, while the head of the other bolt is above it. This precise arrangement, however, is not positively necessary, although it is preferred.

In order to brace the spokes near their inner ends, I employ wedge-shaped or triangular blocks G, which fit the angles formed by the spokes and which are secured thereto by glue and by means of nails or other metallic securing devices $g$. These wedges or blocks should be separately formed and when made of wood should have the grain running crosswise from spoke to spoke, so that any shrinkage that might occur will be toward the axis of the pulley and not laterally from the spokes. The outer edges of the hub-sections extend beyond the inner portions of the braces G and bear against their opposite sides, inasmuch as the latter are made of the same width as the spokes.

Preferably the edges of all parts of the pulley are rounded off in order to present an attractive appearance.

The pulley is split or divided into two equal parts, the line of division running straight through the axis of the hub, through two of the arms or spokes, and through diametrically opposite portions of the rim. The two divided spokes are preferably made somewhat larger in cross-section than the others in order that each section of the divided spoke may be of sufficient size to afford the requisite strength.

Where the pulley is divided, the middle ring $x$ is made to overlap the lines of division, as shown at $z$ in Fig. 1, and the screws C secure the adjacent ends of the ring to the sections of the divided arms or spokes on opposite sides of the division-lines. The sections of this middle ring are also preferably made to break joints with the other rings, and their ends are preferably arranged to come opposite the ends of the spokes, so that these ends may be secured to the spokes by the screws C.

The outer portions of the divided spokes fit closely together, as indicated in Fig. 2, and transverse bolts H are employed, arranged close to the rim to connect the spoke-sections. Between these outer portions and the bore the spoke-sections are separated a slight distance by the spaces h, which will allow the bore to be expanded and contracted sufficiently when securing the pulley to, taking it from, or adjusting it on the shaft. The heads of the bolts H are preferably arranged in squared or angular recesses in the spokes, so that the bolts may be prevented from turning when the nuts are being adjusted.

The pulley which I have shown and described is composed entirely of wood, with the exception, of course, of the bolts and screws employed. A pulley so constructed may be cheaply made and sold at a cost much below metallic pulleys of the same size, and while most of my improvements are especially intended for pulleys constructed entirely of wood in the manner before described they may be employed in pulleys of other constructions. Where the size of the pulley is very materially increased, it may be advisable to construct it of metal or partly of metal. Some of my improvements may be employed in such pulleys.

The bore of the pulley shown is adapted for shafting of only one size—that is to say, the pulley may be applied directly to a shaft without the use of a bushing; but I preferably always employ a bushing of the kind such as that shown in Fig. 5 or of other suitable kind, and by using bushings of various standard sizes the same pulley may be applied to shafts of different diameters. The pulley is applied to, taken from, or adjusted on a shaft in a similar manner to that of other pulleys of this general class. Inasmuch, however, as the nuts of the clamping-bolts are very easily accessible and as the bolts are held against turning while the nuts are being adjusted, the pulley may be taken from, applied to, or adjusted on a shaft more easily and expeditiously than a pulley without such improvements. Inasmuch as the spokes or arms of the pulley are comparatively thin and narrow, the pulley will run easily without such agitation of the air as is incident to the use of pulleys having thick wide arms.

In my application for patent, Serial No. 132,634, filed November 24, 1902, I have shown a belt-pulley resembling that herein shown in some respects. The rim and the manner of connecting the rim with the spokes are similar; but the hub and the manner of connecting the hub with the spokes are different. In my application referred to the claims relate to the construction of the hub (not herein shown) in connection with the other parts of the pulley.

I claim as my invention—

In a belt-pulley the combination of a series of segments arranged end to end to form a middle ring and having dovetailed mortises extending from the inside of the ring part way to the outside or periphery thereof, solid spokes of substantially the same thickness as the middle ring beveled to join each other around the hub-opening and having at their outer ends dovetailed tenons fitting the mortises in the middle ring, two divided spokes connected at their inner ends with the solid spokes and at their outer ends with the middle ring and each of which comprises two parts with their outer ends near the rim arranged in contact with each other, a clamping-bolt connecting the two parts of each divided spoke at their points of contact near the rim, hub-sections secured to the inner ends of the spokes, clamping-bolts carried by the hub-sections and securing them together, and a series of segments of less depth than the middle ring placed end to end and side by side, and secured together on opposite sides of the middle ring.

In testimony whereof I have hereunto subscribed my name.

PHILIP MEDART.

Witnesses:
A. M. PARKINS,
J. A. MACDONALD.